(12) United States Patent
Pudlewski

(10) Patent No.: US 10,389,644 B2
(45) Date of Patent: Aug. 20, 2019

(54) METHOD AND APPARATUS FOR WAVEFORM INDEPENDENT CONGESTION CONTROL

(71) Applicant: THE UNITED STATES OF AMERICA AS REPRESENTED BY TE SECRETARY OF THE AIR FORCE, Washington, DC (US)

(72) Inventor: Scott Pudlewski, Whitesboro, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 15/680,487

(22) Filed: Aug. 18, 2017

(65) Prior Publication Data

US 2019/0058666 A1 Feb. 21, 2019

Related U.S. Application Data

(60) Provisional application No. 62/458,708, filed on Feb. 14, 2017.

(51) Int. Cl.
*H04L 12/807* (2013.01)
*H04L 12/841* (2013.01)
*H04L 12/801* (2013.01)

(52) U.S. Cl.
CPC .............. *H04L 47/27* (2013.01); *H04L 47/12* (2013.01); *H04L 47/28* (2013.01)

(58) Field of Classification Search
CPC ......... H04L 47/27; H04L 47/12; H04L 47/28; H04L 47/225; H04L 1/187; H04L 1/1832; H04L 12/807
See application file for complete search history.

(56) References Cited

U.S. PATENT DOCUMENTS

| | | | |
|---|---|---|---|
| 2014/0169164 A1* | 6/2014 | Oguchi | H04L 47/193 370/230 |
| 2016/0212032 A1* | 7/2016 | Tsuruoka | H04L 43/106 |
| 2016/0226740 A1* | 8/2016 | Van Oost | H04L 43/0894 |
| 2018/0109355 A1* | 4/2018 | Werner | H04L 1/0089 |

* cited by examiner

*Primary Examiner* — Kibrom T Hailu
(74) *Attorney, Agent, or Firm* — Joseph A. Mancini

(57) ABSTRACT

A method and apparatus for controlling congestion of information packets in a computer network comprising at least a first node and a second node is provided. At each iteration of the method a transmission rate for information packets sent from the first node to the second node and a reception rate for responses received from the second node to the first node are determined. The rates may be determined from timestamps inserted into the information packets. The length of a congestion window is increased when a time average of the transmission rate is no greater than a time average of the reception rate and decreased when a time average of the transmission rate is greater than a time average of the reception rate by at least a threshold amount. Transmission of information packets is adjusted dependent upon the congestion window.

18 Claims, 4 Drawing Sheets

METHOD AND APPARATUS FOR WAVEFORM INDEPENDENT CONGESTION CONTROL

PRIORITY CLAIM

This application claims the benefit of U.S. Provisional Application No. 62/458,708, filed on Feb. 14, 2017, entitled 'Capacity-Estimation-Based Congestion Control for Transport Control Protocols' and is hereby incorporated herein in its entirety.

STATEMENT OF GOVERNMENT INTEREST

The invention described herein may be manufactured, used, and licensed by or for the Government of the United States for all governmental purposes without the payment of any royalty.

BACKGROUND

The transmission control protocol (TCP) provides a mechanism for node-to-node connectivity in a packet-based network, such as the Internet. Congestion in a network occurs when a node is carrying more data than it can handle. TCP provides a number of congestion control protocols, from TCP Tahoe to the more modern CUBIC and Compound TCP, and finally to optimal computer-generated TCP implementations. All of the protocols, with the exception of optimal computer-generated TCP, use measurements of either packet loss or an increase in round trip time (RTT) delay to estimate the congestion state of the network. In addition, there have been a number of protocols that use a combination of both of these measurements to attempt to implicitly distinguish channel losses from congestion losses or correct losses with channel coding. However, even these protocols are not able to perform well in moderate to extremely lossy networks.

Sole reliance on packet loss and round trip time (RTT) as congestion indicators results in three important fundamental limitations in transport protocols.

Poor Performance in Lossy Networks.

Traditionally, the primary reason TCP protocols perform poorly in lossy networks is that there is no way to distinguish between packet losses due to congestion and losses due to poor channel conditions. Without using explicit messaging from within the network, most end-to-end transport protocols are forced to assume that a channel loss is due to congestion. One way to control congestion is through the use of a congestion window, where the congestion window specifies the maximum number of unacknowledged packets permitted in the network at any given time. Thus, the congestion window may be reduced even though the poor performance is due to poor channel conditions. While protocols exist that attempt to estimate the capacity and reduce the impact of channel losses on throughput performance, packet loss is still the main feedback mechanism used to identify congestion. Since TCP protocols must prevent network-wide congestion collapse, this results in generally pessimistic performance that severely limits throughput in lossy networks.

Susceptibility to Intelligent Jamming.

There have been a number of studies showing that the TCP congestion control protocol is extremely vulnerable to a "smart" jammer. A smart malicious node can interrupt a small number of packets and cause the server to respond as if the network is congested. Packet loss is very easy for an external node (i.e., a node not belonging to the network) to manipulate, which can result in severe throughput reduction with minimal jamming power.

Path Dependence.

Since both packet loss and the RTT are path-based measurements and assume that a) packets will experience the same network conditions previous packets experienced, and b) changes in window size or transmission rate will have a direct impact on these conditions, they both implicitly assume that paths in the network are stable. This assumption also holds for "multi-path" TCP protocols. However, the stable path assumption may be violated, especially for more recent opportunistic and cooperative routing protocols, resulting in extremely poor TCP performance.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
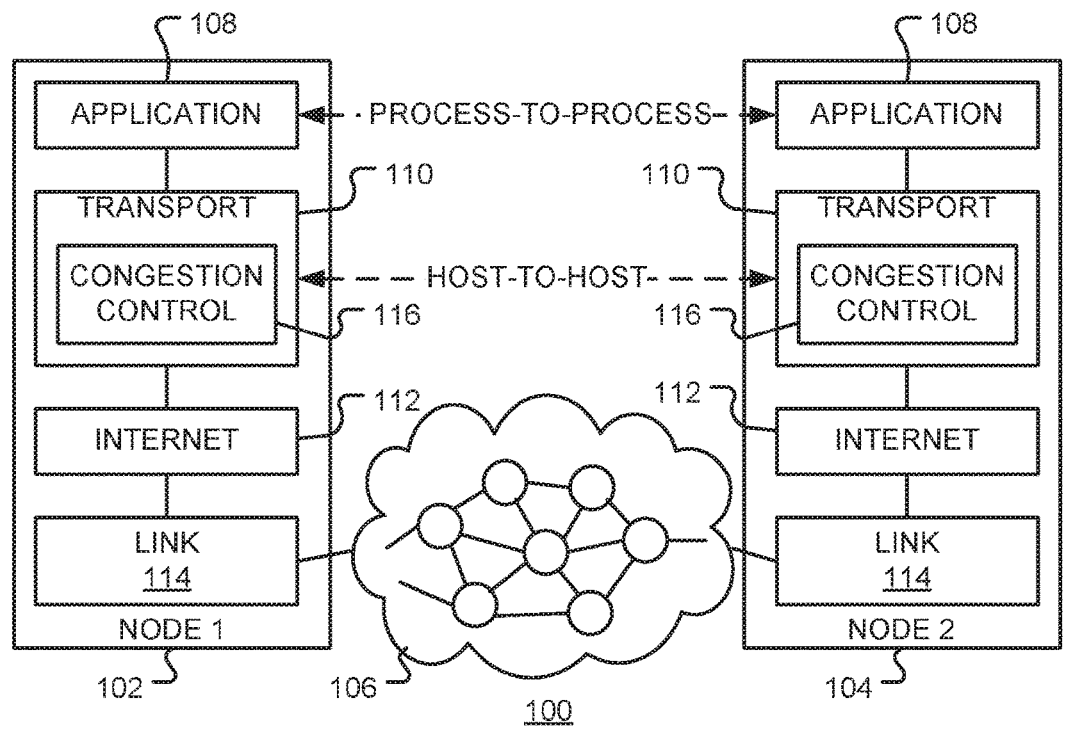
FIG. 1 is a diagrammatic representation of a network, in accordance with a representative embodiment.

The various methods, systems, apparatuses, and devices described herein generally relate to congestion control in a packet-based network.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

FIG. 1 is a diagrammatic representation of a network 100, in accordance with a representative embodiment. First node 102 is connected to second node 104 via network infrastructure 106. Network infrastructure 106 includes the physical medium of the connection (sometimes referred to as the 'PHY' layer) and may be a wired connection, a wireless connection or a combination thereof. Further, network infrastructure 106 may include multiple nodes and connections that define multiple communication paths between first node 102 and second node 104.

For communication, the nodes 102 and 104 use a common protocol. Logically, and maybe physically, the protocol is segmented into a number of layers. Application layer 108 is specific to applications such as World Wide Web (WWW) access, electronic mail (e-mail), file transfer protocol (FTP), etc., and enables communication between processes executed by node 1 and node 2. Transport layer 110 uses a Transmission Control Protocol (TCP) and directs information packets to a specific application on a computer using a port number. The transport layer enables host-to-host communication. Internet Protocol (IP) layer 112 directs information packets to a specific computer using an IP address. Routers in the network infrastructure 106 use address information in packets to select which path a packet takes through the network infrastructure 106. Link or hardware layer 114 converts binary information packet data to network signals and vice versa. Link layer 114 may include media access control (MAC) devices such as, for example, an Ethernet network card, modem for telephone lines, a radio transceiver, etc.

Transport layer 110 provides end-to-end services that are independent of the structure of user data and the logistics of exchanging information for any particular specific purpose. Its responsibilities include end-to-end message transfer independent of the underlying network, along with error control, segmentation, flow control, and application addressing (via port numbers). In addition, transport layer 110 provides a congestion control mechanism 116, designed to avoid packet congestion in the network.

In general, the devices, systems, and methods described herein relate to the implementation of a Waveform Independent Protocol (WIP) for congestion control in a packet-based computer network. In some embodiments, WIP uses the difference between the send rate and the estimated receive capacity to estimate a level of congestion and adjusts operation of the network accordingly.

Previous systems have mostly used three main congestion indicators: Explicit congestion notification (ECN), packet loss and round trip time (RTT). Each of these has disadvantages and limitations as described below.

Explicit Congestion Notification.

Explicit congestion notification (ECN) messages are used to inform the source of congestion in at least one of the routers between the source and destination. While the nature of the notification can range from explicit queue length measurements to simply marking one or more packets with a "congestion" bit, the purpose is always to explicitly indicate congestion in the network using feedback messages. The primary benefit of ECN is that there is no ambiguity in the feedback channel, and congestion can be acted upon while other "similar" signals (i.e., channel losses or MAC-layer delays) are easily ignored. The main drawback of ECN is implementation and introduction into a network. For ECN to be effective, each queue (or potential queue in pathless routing protocols) must be willing and able to send ECN notifications. If even a single router does not agree to send notifications, there is the potential for network-wide congestion collapse. Because of this, existing implementations that use ECN will generally still react to packet losses as a fail-safe mechanism, and only utilize ECN as a technique to reduce packet losses due to buffer overflow.

Packet Loss.

Nearly all current TCP implementations utilize packet loss as an indication of congestion. The reason is that the vast majority of links in the Internet are wired links, and in a wired link, the most probable reason for packet loss is buffer overflow due to network congestion. Even most "wireless" connections (i.e., LTE or 802.11) are only wireless for the first and/or last hop of the link, and are reliable wired links throughout the remainder of the path. Unfortunately, in multi-hop wireless networks such as the Internet of Things (IoT) or tactical military networks, channel conditions can be very poor resulting in far more packet losses due to channel conditions than due to congestion. This results in many false congestion indications, leading to a potentially severe throughput decrease.

RTT Increase.

In the TCP Vegas protocol, congestion is indicated by an increase in the RTT between source and destination. While there have been a couple of other techniques for using RTT to indicate congestion, the basic idea is that, assuming that the routing path is stable, an increase in RTT can be viewed as an increase in queuing delay somewhere in the network. This queuing delay increase is then interpreted as a congested link. RTT-based techniques allow a source node to estimate queue lengths (similar to ECN implementations) without additional explicit messaging. The main reason that TCP Vegas (or other similar protocols) has not been widely adopted is that it tends to compete poorly with traditional loss-based TCP implementations. TCP Vegas decreases the transmission rate before the queues are full. Consequently, it is always less aggressive than loss-based TCP implementations, resulting in an unfair distribution in capacity.

Statistical TCP.

Statistical TCP, such as TCP Remy, is a computer-generated congestion control protocol that takes a network model, network objectives (such as the maximizing of some utility function) and a network traffic model, and defines an end-to-end congestion control algorithm. To indicate congestions, the TCP Remy protocol uses estimates of the source and destination capacity along with the RTT history.

With a stable network topology and a good model for both that topology and the traffic generation, a congestion control algorithm designed by the TCP Remy protocol will likely be superior to anything developed for general use. However, in many cases, the topology and traffic patterns vary wildly from one moment to the next. In these cases, a congestion control protocol designed by Remy protocol for one set of assumptions may not work at all for the new network reality, resulting in significant operator interaction in order to continuously update and distribute the new congestion control protocols. In addition, reconfiguring Remy is extremely computationally intensive.

In general, the devices, systems, and methods described herein relate to the implementation of a Waveform Independent Protocol (WIP) for congestion control in a packet-based computer network. In accordance with an aspect of the present disclosure, capacity measurements at the source and destination are used as a congestion indication. By measuring the received packet rate to determine receiver capacity, lost packets are implicitly ignored, allowing for a congestion indicator that will only respond to congestion. This removes the dependency on packet loss and results in a protocol that doesn't respond to packet loss as congestion. In addition, the capacity measurement is as "aggressive" as the packet loss approach, so there is no throughput loss due to competing with loss-based TCP. In accordance with certain embodiments, the capacity measurements can be made with only changes to the source node, resulting in a much more practical implementation than ECN-based solutions.

In some embodiments, WIP uses the difference between the send rate and the estimated receive capacity to estimate a level of congestion and adjusts operation of the network accordingly. Some features of WIP are:

Waveform Independence.

The measurements used in WIP to estimate congestion are completely independent of the underlying path through the network infrastructure 106. Therefore, as the name suggests, WIP is waveform independent. Specifically, the protocol will work with any type of waveform, including single path, multi-path, and pathless. The term "waveform" is used here to mean a signal or radio protocol and generally refers to signals in the physical (PHY) and media access control (MAC) layer of a network. Example radio protocol are defined in the Institute of Electrical and Electronics Engineers (IEEE) standard 802.11 for wireless local area networks, the 'Highband Networking Waveform' for ad-hoc military networks, and the 4G long term evolution (LTE) protocol of the International Telecommunications Union (ITU) for mobile telecommunications. However, the WIP disclosed here may also be used in other packet-based networks.

Loss Resilient.

The WIP congestion measurements are independent of packet loss. Therefore, losses have no effect on the congestion window size.

End-to-End.

WIP is a true end-to-end transport solution with no requirement for explicit congestion control (ECN) messages, allowing for easy introduction into a network containing legacy devices.

Sender-Side Protocol.

WIP can be implemented as a sender-side modification to many flavors of the transport control protocol (TCP) of a network, including variants such as TCP Reno and TCP Westwood. This allows for very simple implementation and deployment as the solution to a network utility maximization problem.

One embodiment of the waveform independent protocol (WIP) uses a server-side modification to the congestion detection portion of the TCP congestion control algorithm. Embedded TCP timestamps are used to measure both the transmit and response rates for a given flow to estimate the capacity of the path at the source and at the destination. By comparing these measurements, it can be determined whether the source is sending packets faster than the network can deliver them to the destination. Some advantages of WIP compared to existing protocols include:

Loss Resilience.

The WIP congestion control algorithm is independent of channel losses. This is accomplished by separating the congestion control functionality from the reliability functionality. The congestion control of WIP uses the rate at which packets are received to calculate a receive rate of a flow s. The receive rate is denoted by $r_s$. By comparing $r_s$ to the transmission rate, denoted by $x_s$, the source can determine if the transmission rate is too high for the network to support. This difference, denoted as $\lambda^s$, is used as the congestion indication without needing to rely on packet loss, round trip time (RTT) changes, or explicit notifications.

Path Independence.

Traditional congestion detection techniques rely on detecting changes over time along a path. This results in an inherent dependence on the existence of one or more stable paths in the underlying routing technique. However, there exist a number of techniques for which there does not exist any stable path throughout the network. Indeed, in these opportunistic techniques, each subsequent packet could potentially traverse a different series of links to reach the destination. WIP determines congestion based on rates $r_s$ and $x_s$, which are both flow-based parameters rather than path-based, so there is no such path dependency in WIP.

As an indicator of congestion, WIP uses the measured parameter $$\lambda^s = \max(\hat{x}_s - \hat{r}_s, 0), \qquad (1)$$

where $\hat{x}_s$ is the time average or smoothed transmission rate of a flow s, and $\hat{r}_s$ is the time average or smoothed reception rate of response packets, to determine whether there is congestion in the network. The condition $\lambda^s > \alpha$, where $\alpha$ is a small positive parameter, indicates that there is congestion in the network and that the size of the congestion window should be reduced. The congestion window specifies the maximum number of unacknowledged packets permitted in the network at any given time. In alternative embodiment, the condition is used to indicate that the transmission rate should be reduced. The parameter a may be selected by the designer or by user.

For WIP to be truly independent of losses, $\lambda^s$ is calculated only for packets that have been received. This can be done using the TCP timestamp option.

Figure 2:
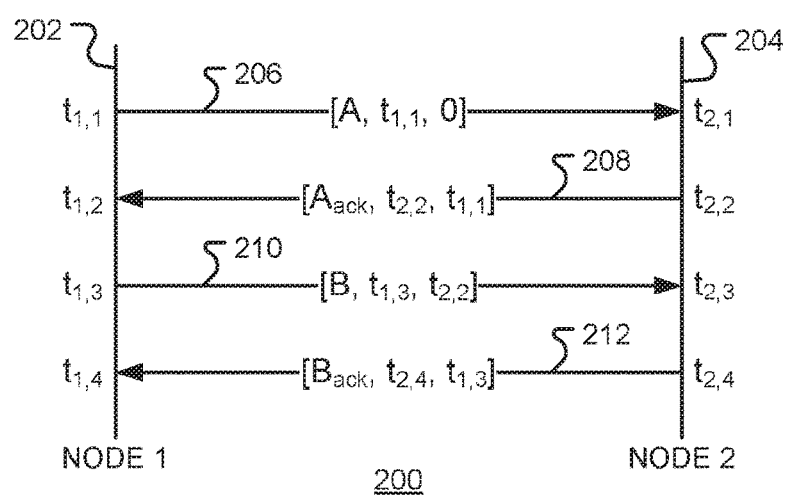
FIG. 2 is a signal flow chart illustrating packet flow in a network, in accordance with a representative embodiment.

Rates $x_s$ and $r_s$ may be calculated for every set of sequential packets received using both the send and receive timestamps in the packets. FIG. 2 is a signal flow chart 200 illustrating packet flow in a network, in accordance with a representative embodiment. FIG. 2 shows an example of four packets exchanges between first node (node 1) 202 and second node (node 2) 204. The time at interval i for node n is defined as $t_{n,i}$. Thus, at time $t_{1,1}$ packet 206 is sent from node 1 to node 2. Each packet is labeled as [segment, timestamp, echoed timestamp]. For example, packet 206 contains segment A and was sent at time $t_{1,1}$, but contains no echoed timestamp. The packet is received at node 2 at time $t_{2,1}$. At time $t_{2,2}$ packet 208 is sent from node 2 to node 1, acknowledging receipt of packet 206. Packet 208 contains segment $A_{ack}$ and was sent at time $t_{2,2}$, and echoes the timestamp $t_{1,1}$ as the received packet. Similarly packet 210 is sent at time $t_{1,3}$ and is acknowledged in packet 212 that is received at node 1 at time $t_{1,4}$ Using this information, node 1 can calculate rate $x_s$ and $r_s$ using $$x_s = \frac{t_{1,3} - t_{1,1}}{|A|} \qquad (2)$$

$$r_s = \frac{t_{2,4} - t_{2,2}}{|B|}$$

where $t_{1,1}$ and $t_{1,3}$ are consecutive transmission times from node 1, $t_{2,2}$ and $t_{2,4}$ are consecutive response times from node 2, |A| is the size of segment A in bytes and |B| is the size of segment B in bytes, $x_s$ is the rate at which segment A was transmitted, and $r_s$ is the rate at which segment B was received. In equation (2), the time differences are normalized by the number of bytes, but other normalizations could be used.

In the example above it is assumed that the receiver acknowledges each packet. However, it is easy to extend this protocol to schemes that acknowledge groups of packets with a slight decrease in the precision of the calculated capacity values.

Figure 3:
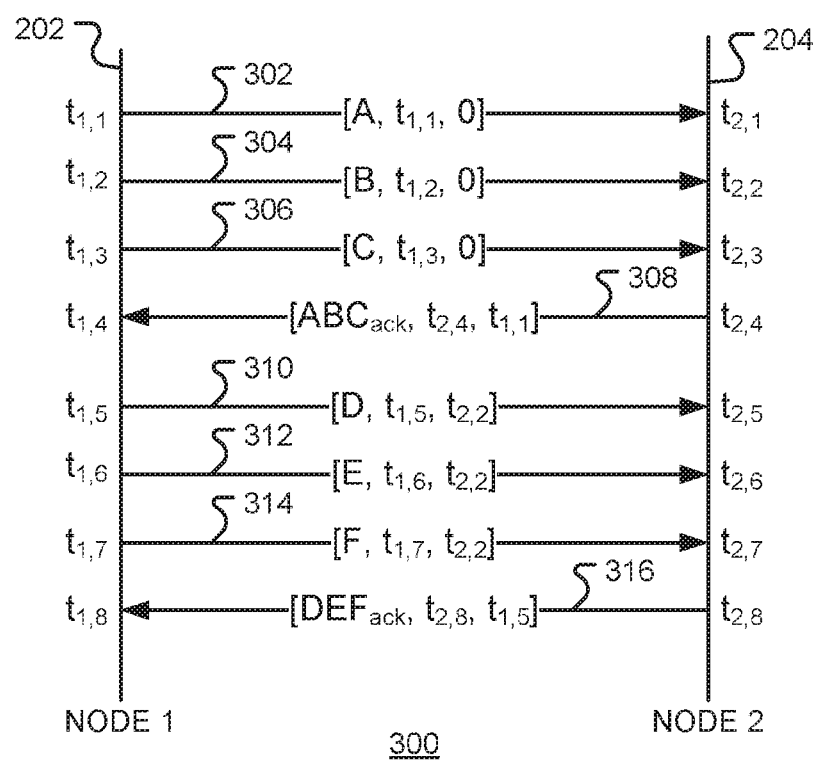
FIG. 3 is a further signal flow chart illustrating packet flow in a network, in accordance with a representative embodiment.

FIG. 3 is a further signal flow chart 300 illustrating packet flow in a network, in accordance with a representative embodiment. In this example, packets are transmitted in groups of three. Packets 302, 304 and 306 contains segments A, B, C, respectively, and are acknowledged in packet 308. Packets 310, 312 and 314 contains segments D, E, F respectively, and are acknowledged in packet 316. Using this information, node 1 can calculate rates transmission and response rates $x_s$ and $r_s$ using $$x_s = \frac{t_{1,5} - t_{1,1}}{|A| + |B| + |C|} \qquad (3)$$

$$r_s = \frac{t_{2,8} - t_{2,4}}{|D| + |E| + |F|}$$

It will be apparent that group of packets associated with each acknowledgment may contain any selected number of packets. The indicator $\lambda_s$ in equation (1) or equation (3) is used as a congestion indication for flow s. The indicator may be used to control operation of the network. For example, the indicator may be time averaged (smoothed) and used to adjust a congestion window, where the congestion window specifies the maximum number of unacknowledged packets permitted in the network at any given time.

The smoothed transmission and response rates may be updated from iteration i−1 to iteration i as $$\hat{x}_s(i) = \mu \hat{x}_s(i-1) + (1-\mu) x_s(i)$$

$$\hat{r}_s(i) = \mu \hat{r}_s(i-1) + (1-\mu) r_s(i) \qquad (4)$$

where $0 \leq \mu < 1$ is a smoothing factor. Thus, the transmission rate $\hat{x}_s$ is determined as a time average of the difference between the second transmission time and the first transmission time, divided by the length of the first information packet; and the reception rate $\hat{r}_s$ is determined as a time average of the difference between the second response time and the first response time, divided by the length of the second information packet. The time averaging in equation (4) is referred to as an exponential average. Other smoothing or time-averaging approaches will be apparent to those of ordinary skill in the art.

For example, an evolution algorithm for a congestion window $\omega$ may be defined as $$\omega_{i+1} = \begin{cases} \omega_i + \kappa & \lambda_s \leq 0 \\ \gamma \omega_i & \lambda_s \geq \alpha \\ \omega_i & \text{otherwise} \end{cases} \qquad (5)$$

where $\omega_i$ is the congestion window at time i, $\kappa > 0$ is an additive increase factor, and $0 < \gamma < 1$ is a multiplicative decrease factor. The congestion indicator $\lambda_s$ may be used in other window evolution algorithms, including algorithms already known in the art. For example, the comparisons of $\lambda_s$ to 0 and $\alpha$ may be used as the substitute for a prior indicator such as a packet loss, round trip time (RTT) increase, or explicit congestion notification (ECN).

More generally, the length of the congestion window is increased when a time average of transmission rate is no greater than a time average of the reception rate and decreased when the length of the congestion window when a time average transmission rate is greater than a time average of the reception rate by at least a threshold amount, $\alpha$.

Controlling the congestion window using an implementation of equation (5) results in similar throughput performance to TCP Reno when the channel conditions are good. However, when there are many packet losses, the approach described in equation (5) performs far better than traditional loss-based congestion control protocol such as TCP Reno.

Figure 4:
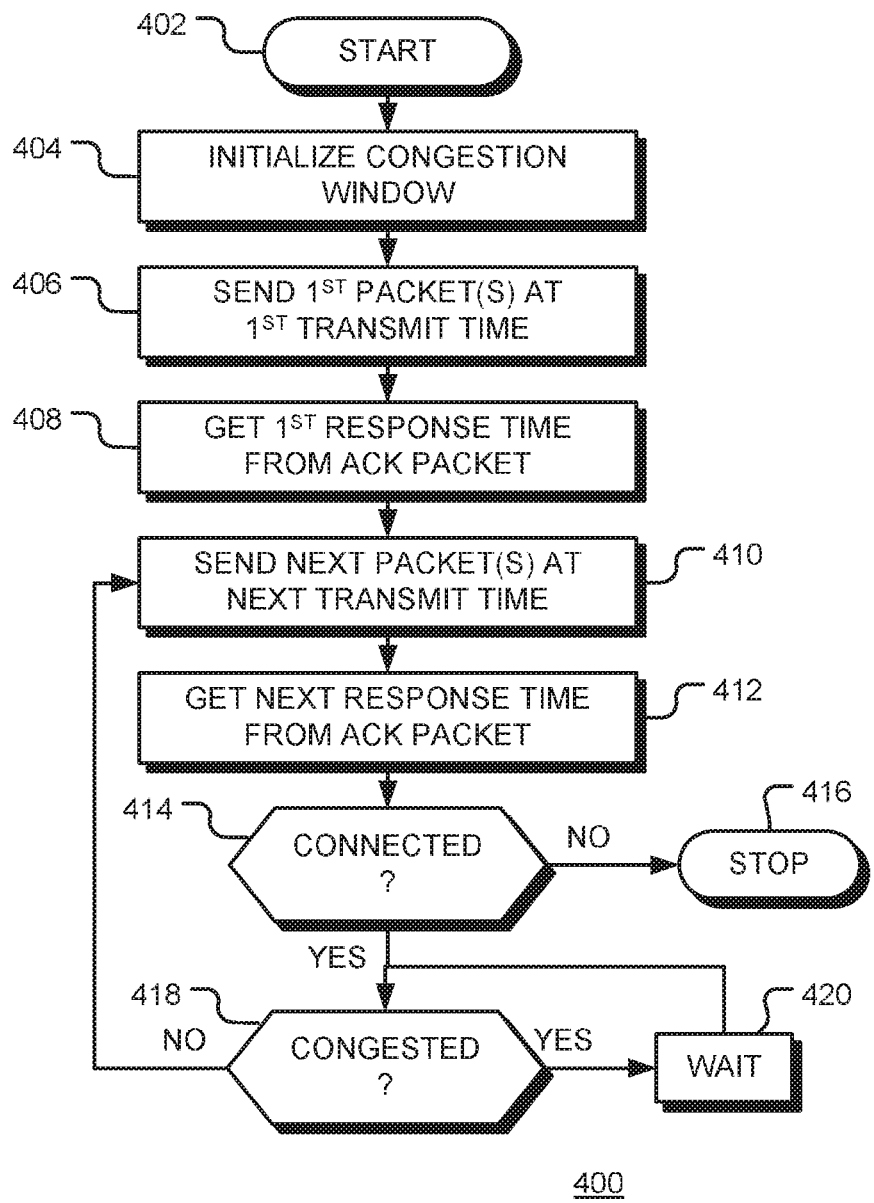
FIG. 4 is a flow chart of a method of operation of a first node of a network, in accordance with a representative embodiment.

FIG. 4 is a flow chart of a method 400 of operation of a first node of a network. Following start block 402, a congestion window is initialized at block 404. At block 406 a packet or group of packets is sent from the first node to a second node at a first transmission time. The transmission time may be indicated in a packet by a timestamp. At block 408, an acknowledgment response is received from the second node. The acknowledgment response includes a timestamp indicating when the response was sent from the second node. At block 410 a next packet, or group of packets, is sent from the first node to the second node and at block 412 at timestamp indicating the next response time is read from the corresponding acknowledgment from the second node. Only transmission and response times for packets that are acknowledged are recorded for use in the congestion control mechanism. If the connection between the first and second nodes is terminated, as depicted by the negative branch from decision block 414, the method ends at block 416. If the connection between the first and second nodes is still in place, as depicted by the positive branch from decision block 414, flow continues to decision block 418. If the network is congested, that is, if the number of unacknowledged packets in the network exceeds the congestion window, the first node enters a wait loop, as depicted by the positive branch from decision block 418 and wait block 420. If the network is not congested, as depicted by the negative branch from decision block 418, flow continues to block 410 and the next information packet is sent from node 1 to node 2. In this manner, consecutive transmission times and response times are recorded for use by the congestion control mechanism.

Figure 5:
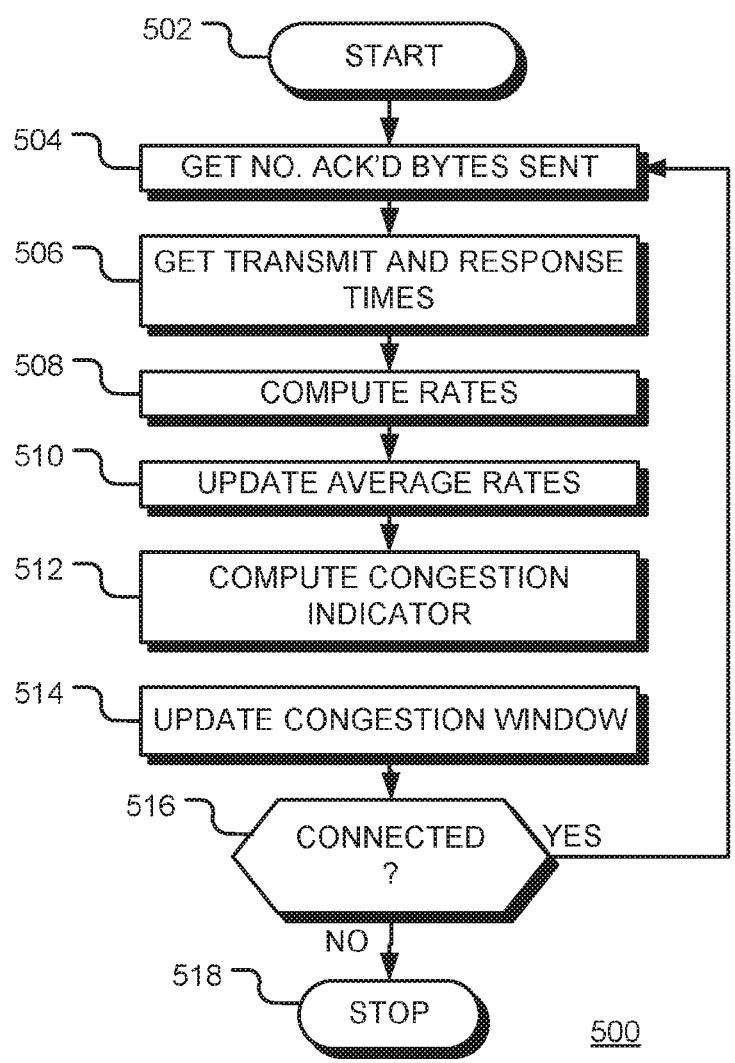
FIG. 5 is a flow chart of a method for congestion control in a network, in accordance with a representative embodiment.

FIG. 5 is a flow chart of a method 500 for congestion control in a network. The method may be performed in series with the method shown in FIG. 4, or in parallel, or a mixture thereof. Following start block 502, the number of bytes sent by a first node and acknowledged by a second node, is retrieved at block 504. At block 506, the corresponding transmission and response times are retrieved (these are collected as described above with reference to FIG. 4). At block 508 the transmission and response rates are determined from the transmission and response times and the number of bytes, as described above in equations (2) and (3) for example. At block 510 average or smoothed transmission and response rates are updated. The average rates may be computed, for example, as an exponential average (i.e., a weighted sum of a prior average rate and the new rate as described in equation (4)) or as a linear average, or by some other smoothing algorithm. At block 512, the congestion indicator is computed as described in equation (1), for example, and at block 514 the congestion window is updated from the congestion indicator, using equation (5) for example, or some other window update function. If the connection is terminated, as depicted by the negative branch from decision block 516, the method ends at block 518. Otherwise, as depicted by the positive branch from decision block 516, flow returns to block 504 to enable iterative update of the congestion window.

An embodiment of the disclosure relates to a method for controlling congestion of information packets in a computer network having at least a first node, such as a server for example, and a second node. In accordance with the method a length of congestion window is initialized. The congestion window indicates a maximum number of unacknowledged packets in the computer network. The following actions are then performed iteratively:
    sending a first information packet from the first node to the second node at a first transmission time;
    receiving, by the first node, a response to the first information packet from the second node at a first response time;
    sending a second information packet from the first node to the second node at a second transmission time;
    receiving, by the first node, a response to the second information packet from the second node at a second response time;
    determining a transmission rate from a difference between the second transmission time and the first transmission time and a length of the first information packet;
    determining a reception rate from a difference between the second response time and the first response time and a length of the second information packet; and
    adjusting the length of the congestion window dependent upon a difference between the transmission rate and the reception rate.

The length of the congestion window may be adjusted dependent upon a difference between the transmission rate and the reception rate by increasing the length of the congestion window when a time average of the transmission rate is no greater than a time average of the reception rate, and decreasing the length of the congestion window when a time average of the transmission rate is greater than a time average of the reception rate by at least threshold amount.

In one example embodiment, the length of the congestion window is increased by adding an additive factor to the length of the congestion window and decreased by multiplying the length of the congestion window by a multiplicative factor less than one. Other adjustment schemes may be used.

The transmission rate may be determined as a time average of the difference between the second transmission time and the first transmission time, divided by the length of the first information packet. The reception rate may be determined as a time average of the difference between the second response time and the first response time, divided by the length of the second information packet.

The response rate may be determined from timestamps inserted, by the second node, into the responses. In addition, timestamps indicative of the transmission time, may be inserted into packets transmitted from the first node and copied into the corresponding responses.

In one embodiment, the information packets are protocol data units transported in the computer network using a Transmission Control Protocol (TCP).

The congestion window may be used to alter and improve the operation of the computer network. For example, transmission of information packets from the first node to the second node may be suspended when the number of unacknowledged information packets in the computer network exceeds the length of the congestion window and continued when the number of unacknowledged information packets in the computer network is less than the length of the congestion window.

Thus, congestion of information packets in a computer network comprising at least a first node and a second node is controlled by initializing a length of congestion window to indicate a maximum number of unacknowledged packets in the computer network and iteratively performing the actions:

determining a transmission rate for information packets sent from the first node to the second node;

determining a reception rate using timestamps in responses received from the second node to the first node, where the timestamps are inserted by the second node;

increasing the length of the congestion window when the transmission rate is no greater than a time average of the reception rate; and decreasing the length of the congestion window when the transmission rate is greater than a time average of the reception rate by at least a threshold amount.

Certain embodiments of the disclosure relate to computer network comprising a first node and a second node. The first node is configured to transmit information packets to the second node. The second node is configured to respond to information packets received from the first node by inserting a timestamp into a response packet and transmitting the response packet to the first node. The first node is further configured to determine a transmission rate for information packets sent from the first node to the second node, determine a reception rate for response packets received by the first node from the second node from the timestamps in the response packets, and adjust a length of a congestion window dependent upon a difference between the transmission rate and the reception rate.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++ or Java, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for controlling congestion of information packets in a computer network having at least a first node and a second node, the method comprising:
   initializing a length of a congestion window to indicate a maximum number of unacknowledged packets in the computer network, where the length of the congestion window specifies the maximum number of unacknowledged information packets permitted in the computer network at any given time; and
   iteratively performing:
      sending a first information packet from the first node to the second node at a first transmission time;
      receiving, by the first node, a response to the first information packet from the second node at a first response time;
      sending a second information packet from the first node to the second node at a second transmission time;
      receiving, by the first node, a response to the second information packet from the second node at a second response time;
      determining a transmission rate from a difference between the second transmission time and the first transmission time and a length of the first information packet;
      determining a reception rate from a difference between the second response time and the first response time and a length of the second information packet;
      adjusting the length of the congestion window dependent upon a difference between the transmission rate and the reception rate;
      suspending transmission of information packets from the first node to the second node when the number of unacknowledged information packets in the computer network exceeds the length of the congestion window; and
      continuing transmission of information packets from the first node to the second node when the number of unacknowledged information packets in the computer network is less than the length of the congestion window.

2. The method of claim 1, where adjusting the length of the congestion window dependent upon a difference between the transmission rate and the reception rate comprises:
   increasing the length of the congestion window when a time average of the transmission rate is no greater than a time average of the reception rate; and
   decreasing the length of the congestion window when a time average of the transmission rate is greater than a time average of the reception rate by at least threshold amount.

3. The method of claim 2, where:
   increasing the length of the congestion window comprises adding an additive factor to the length of the congestion window; and
   decreasing the length of the congestion window comprises multiplying the length of the congestion window by a multiplicative factor less than one.

4. The method of claim 1, where:
   determining the transmission rate comprises determining a time average of the difference between the second transmission time and the first transmission time, divided by the length of the first information packet; and
   determining the reception rate comprises determining a time average of the difference between the second response time and the first response time, divided by the length of the second information packet.

5. The method of claim 4, where the time average comprises an exponential time average.

6. The method of claim 1, further comprising:
   inserting, by the second node, a timestamp indicative of the first response time into the response to first information packet; and
   inserting, by the second node, a timestamp indicative of the second response time into the response to second information packet,
   where the congestion window is maintained by the first node.

7. The method of claim 6, further comprising:
   inserting, by the first node, a first timestamp indicative of the first transmission time into the first information packet;
   inserting, by the first node, a second timestamp indicative of the second transmission time into the second information packet.

8. The method of claim 7, further comprising the second node:
   reading the first timestamp from the first information packet;
   inserting the first timestamp into the response to first information packet;
   reading the second timestamp from the second information packet; and
   inserting the second timestamp into the response to second information packet.

9. The method of claim 7, further comprising:
   inserting, by the first node, the first timestamp into the second information packet.

10. The method of claim 1, where information packets comprise protocol data units transported in the computer network using a Transmission Control Protocol (TCP).

11. The method of claim 1, where determining the transmission rate from the difference between the second transmission time and the first transmission time and the length of the first information packet is performed after the first information packet is received by the second node.

12. A method for controlling congestion of information packets in a computer network comprising at least a first node and a second node, the method comprising:
   initializing a length of congestion window to indicate a maximum number of unacknowledged packets in the computer network; and
   iteratively performing:
      determining a transmission rate for information packets sent from the first node to the second node;
      determining a reception rate using timestamps in responses received from the second node to the first node, where the timestamps are inserted by the second node;
      increasing the length of the congestion window when a time average of the transmission rate is no greater than a time average of the reception rate;
      decreasing the length of the congestion window when a time average of the transmission rate is greater than a time average of the reception rate by at least a threshold amount;

suspending transmission of information packets to the second node when the number of unacknowledged information packets in the computer network exceeds the length of the congestion window; and continuing transmission of information packets to the second node when the number of unacknowledged information packets in the computer network is less than the length of the congestion window.

13. The method of claim 12, where a response is sent from the second node to first node in response to each information packet received at the second node.

14. The method of claim 12, where a response is sent from the second node to first node for each group of information packets received at the second node.

15. A computer network comprising a first node and a second node, where the first node is configured to transmit information packets to the second node;

the second node is configured to respond to information packets received from the first node by inserting a timestamp into a response packet and transmitting the response packet to the first node; and the first node is further configured to:

determine a transmission rate for information packets sent from the first node to the second node;

determine a reception rate for response packets received by the first node from the second node from the timestamps in the response packets; and adjust a length of a congestion window dependent upon a difference between the transmission rate and the reception rate;

suspend transmission of information packets to the second node when the number of unacknowledged information packets in the computer network exceeds the length of the congestion window; and continue transmission of information packets to the second node when the number of unacknowledged information packets in the computer network is less than the length of the congestion window.

16. The computer network of claim 15, where adjusting the length of the congestion window dependent upon a difference between the transmission rate and the reception rate comprises:

increasing the length of the congestion window when a time average of the transmission rate is no greater than a time average of the reception rate; and decreasing the length of the congestion window when a time average of the transmission rate is greater than a time average of the reception rate by at least threshold amount.

17. The computer network of claim 15, where the information packets comprise protocol data units transported in the computer network using a Transmission Control Protocol (TCP).

18. The computer network of claim 15, where the first node determines the transmission rate only when acknowledgments are received from the second node.

* * * * *